(12) United States Patent
Sun et al.

(10) Patent No.: US 11,282,296 B2
(45) Date of Patent: Mar. 22, 2022

(54) FACE IDENTIFICATION METHOD AND FACE IDENTIFICATION APPARATUS

(71) Applicant: GIGA-BYTE TECHNOLOGY CO., LTD., New Taipei (TW)

(72) Inventors: Pei-Hua Sun, New Taipei (TW); Kai-Hsun Chen, New Taipei (TW)

(73) Assignee: GIGA-BYTE TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 16/997,910

(22) Filed: Aug. 19, 2020

(65) Prior Publication Data

US 2021/0279446 A1 Sep. 9, 2021

(30) Foreign Application Priority Data

Mar. 6, 2020 (TW) ................................. 109107546

(51) Int. Cl.
*G06K 9/00* (2006.01)
*G06T 5/00* (2006.01)
*G06T 7/00* (2017.01)
*G06V 40/16* (2022.01)

(52) U.S. Cl.
CPC ............ *G06V 40/172* (2022.01); *G06T 5/001* (2013.01); *G06T 7/0014* (2013.01); *G06V 40/166* (2022.01); *G06T 2207/10048* (2013.01); *G06T 2207/30201* (2013.01)

(58) Field of Classification Search
CPC ............ G06K 9/00288; G06K 9/00255; G06T 5/001; G06T 7/0014; G06T 2207/10048; G06T 2207/30201

USPC ........................................................ 382/181
See application file for complete search history.

(56) References Cited

U.S. PATENT DOCUMENTS

| 2016/0275518 A1* | 9/2016 | Bowles ..................... G07F 7/06 |
| 2018/0239977 A1* | 8/2018 | Matsimanis ....... G06K 9/00288 |
| 2019/0279398 A1* | 9/2019 | Bai .................... H04N 5/23219 |

FOREIGN PATENT DOCUMENTS

| CN | 108270966 A | 7/2018 |
| CN | 108629298 A | 10/2018 |
| CN | 208873174 U | 5/2019 |
| CN | 110334665 A | 10/2019 |

(Continued)

OTHER PUBLICATIONS

Turk M A et al., "Face recognition using eigenfaces",IEEE., Jun. 3, 1991, pp. 586-591.

(Continued)

*Primary Examiner* — Wednel Cadeau
(74) *Attorney, Agent, or Firm* — Idea Intellectual Limited; Margaret A. Burke; Sam T. Yip (57) ABSTRACT

A face identification method includes performing a distance detection to obtain a detected distance value; determining whether the detected distance value is smaller than a distance threshold; when the detected distance value is smaller than the distance threshold, determining a luminance corresponding to the detected distance value and emitting an infrared light according to the luminance; capturing an infrared light image and performing face identification to the infrared light image; and when the face identification is successful, performing a corresponding event. A face identification apparatus configured to perform the face identification method is further provided.

10 Claims, 8 Drawing Sheets

(56) References Cited

FOREIGN PATENT DOCUMENTS

| CN | 110463183 A | 11/2019 |
|----|-------------|---------|
| EP | 3425558 A1 | 1/2019 |
| JP | 2005323180 A | 11/2005 |
| JP | 2008181468 A | 8/2008 |
| WO | 2019026925 A1 | 2/2019 |

OTHER PUBLICATIONS

Office Action of corresponding Taiwan Patent Application No. 109107546 dated Dec. 3, 2020.
The extended European Search Report of corresponding European Patent Application No. 20193942.0 dated Feb. 25, 2021.
Office Action of corresponding Japan patent application No. 2020166626 dated Dec. 7, 2021.

* cited by examiner

FACE IDENTIFICATION METHOD AND FACE IDENTIFICATION APPARATUS

CROSS-REFERENCE TO RELATED APPLICATIONS

This non-provisional application claims priority under 35 U.S.C. § 119(a) to Patent Application No. 109107546 filed in Taiwan, R.O.C. on Mar. 6, 2020, the entire contents of which are hereby incorporated by reference.

BACKGROUND

Technical Field

This disclosure relates to face identification, in particular to a face identification method and a face identification apparatus.

Related Art

A face identification technology is to find a face in an image, and then compare the found face with contents of a database to compare whether the captured face matches an identity data in the database. The captured image may be a visible light image or an invisible light image. A common method is to digitize features of different parts of the face to generate a face eigenvector combination, and then the face eigenvector combination is stored into the database as the identity data, or compared with stored identity data in the database.

As for a current face identification apparatus, an image camera continuously captures a visible or invisible streaming image. A central processing unit or other computing units continuously perform identification program instructions, analyze whether there is a face in the streaming image and further generate a face eigenvector combination when the face appears. That is to say, whether there is a user in front of the face identification apparatus, a face identification mechanism continuously performs identification work.

Under the above situation, the central processing unit of the face identification apparatus is continuously in a high-computing-load state. If a central processing unit with low computing capability is used, the high-computing-load state will make a whole system operate slowly, which affects operation of other tasks. However, if a central processing unit with high computing capability is adopted, the cost is too high, and meanwhile, a continuous high load also brings high power consumption. High heat brought by high power consumption also often makes the system enter into a low clock rate operation for cooling. The low clock operation further causes hysteresis of system operation.

SUMMARY

In view of the above problem, this disclosure discloses a face identification method and a face identification apparatus, which can duly start face identification program to reduce an average load of a system and power consumption of hardware.

This disclosure discloses a face identification method, including: performing a distance detection to obtain a detected distance value; determining whether the detected distance value is smaller than a distance threshold; when the detected distance value is smaller than the distance threshold, determining a luminance corresponding to the detected distance value and emitting an infrared light according to the luminance; capturing an infrared light image and performing face identification to the infrared light image; and when the face identification is successful, performing a corresponding event.

In at least one embodiment, a range of the distance threshold is divided into a plurality of distance intervals, the luminance has a plurality of set values, and each of the distance intervals corresponds to one of the plurality of set values.

In at least one embodiment, the face identification includes: analyzing whether there is a face in the infrared light image, and correcting an image of the face; capturing a face eigenvector combination of the face; and comparing whether the face eigenvector combination matches one of a plurality of preset eigenvector combinations in an eigenface database.

In at least one embodiment, the face identification method further includes: when the detected distance value is smaller than the distance threshold, capturing a visible light image, and displaying the visible light image.

In at least one embodiment, the face identification method further includes: when the face identification is successful, displaying a successful identification prompt, wherein the successful identification prompt includes a user identity data.

This disclosure further discloses a face identification apparatus, including a distance detector, an infrared light transmitter, an infrared light camera, and a data processing circuit. The distance detector is configured to obtain a detected distance value. The infrared light transmitter is configured to emit an infrared light. The infrared light camera is configured to capture an infrared light image. The data processing circuit is configured to determine whether the detected distance value is smaller than a distance threshold.

When the detected distance value is smaller than the distance threshold, the data processing circuit determines a luminance corresponding to the detected distance value, and drives the infrared light transmitter to emit the infrared light according to the luminance. The data processing circuit performs face identification to the infrared light image. When the face identification is successful, the data processing circuit performs a corresponding event.

In at least one embodiment, the face identification apparatus further includes a visible light camera, configured to capture a visible light image and transmit the visible light image to the data processing circuit; and a display panel, configured to be driven by the data processing circuit to display the visible light image.

In at least one embodiment, the face identification apparatus further includes a casing. The casing includes an internal space and a front surface. The distance detector is disposed on the front surface and configured to obtain the detected distance value in front of the front surface. The data processing circuit is disposed in the internal space. The infrared light transmitter, the infrared light camera, the visible light camera and the display panel are disposed on the front surface.

In at least one embodiment, when the face identification is successful, the data processing circuit drives the display panel to display a successful identification prompt, and the successful identification prompt includes a user identity data.

In at least one embodiment, a range of the distance threshold is divided into a plurality of distance intervals, the luminance has a plurality of set values, and each of the distance intervals corresponds to one of the plurality of set values.

In at least one embodiment, the data processing circuit includes an computing unit, electrically connected to the infrared light camera; a driving circuit, connected to the computing unit and the distance detector, wherein the detected distance value is coded by the driving circuit and then transmitted to the computing unit; and a voltage regulator, connected to the driving circuit and the infrared light transmitter, and receiving a reference voltage from the driving circuit. The computing unit controls the driving circuit to switch the reference voltage according to the detected distance value, so as to regulate a magnitude of a driving voltage output to the infrared light transmitter by the voltage regulator, so that the luminance of the infrared light transmitter corresponds to the detected distance value.

In one or more embodiments of this disclosure, the face identification apparatus switches a face identification program to be in an idle state and being awakened and started at any time. The face identification apparatus determines whether the face identification program is awakened and started according to the detected distance value. Therefore, the face identification apparatus does not continuously perform the face identification program, so that continuous consumption of hardware computing resources into the face identification program is avoided. Therefore, this disclosure can effectively reduce an average computing load of the face identification apparatus and avoids unnecessary power consumption. Meanwhile, reducing the load of the system can avoid an over-temperature condition of the system to avoid the system entering into a low clock rate operation, so that the face identification program can be quickly completed.

In addition, in at least one embodiment, this disclosure utilizes the detected distance value to determine the set values of the luminance configured to illuminate, so as to guarantee that optimal image exposure and image capturing effects of the face can be obtained from far to near, which facilitates performing of the face identification program.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
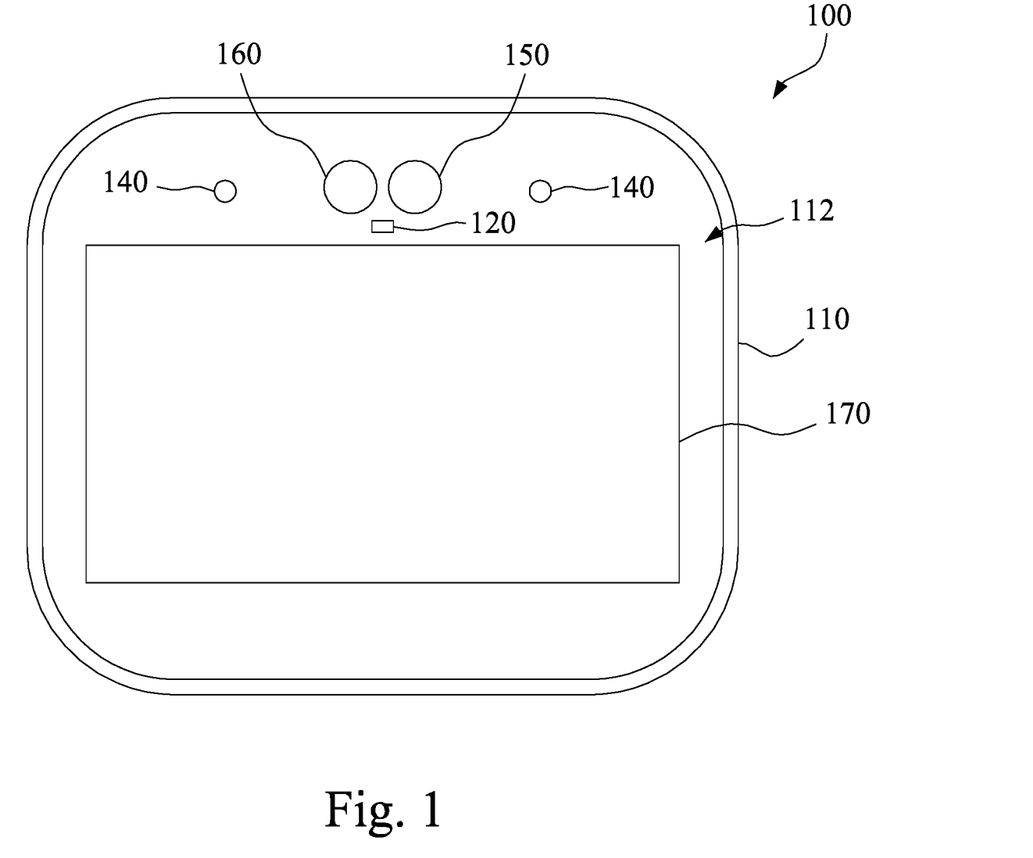
FIG. 1 is a front view according to a first embodiment of this disclosure.
Figure 2:
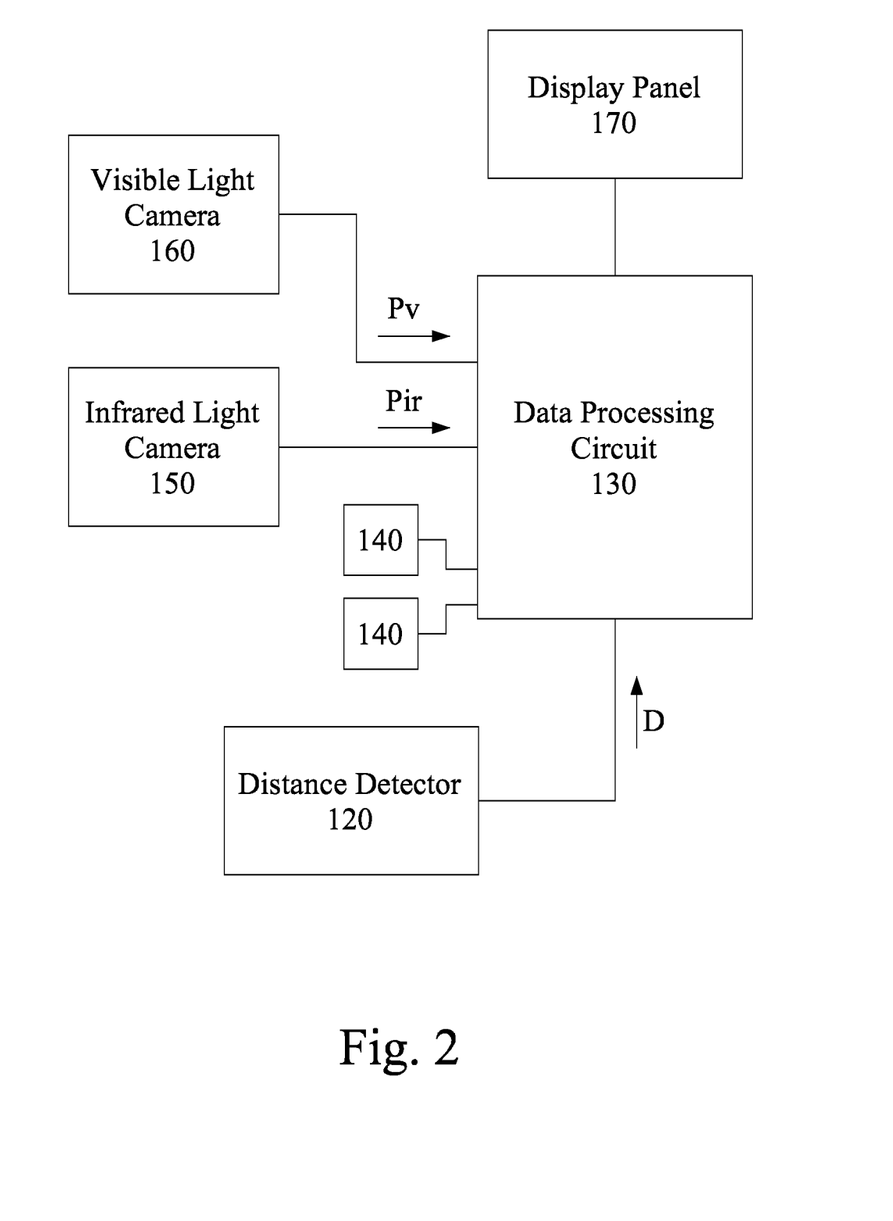
FIG. 2 is a circuit block diagram of the first embodiment of this disclosure.

Referring to FIG. 1 and FIG. 2, a face identification apparatus 100 disclosed by a first embodiment of this disclosure is shown, and is configured to perform a face identification method.

As show in FIG. 1 and FIG. 2, the face identification apparatus 100 includes a casing 110, a distance detector 120, a data processing circuit 130, one or more infrared light transmitters 140, an infrared light camera 150, a visible light camera 160 and a display panel 170.

As show in FIG. 1 and FIG. 2, the casing 110 includes an internal space and a front surface 112. The distance detector 120 is disposed on the front surface 112 and configured to obtain a detected distance value D in front of the front surface 112. The casing 110 is usually fixed to a wall surface or a bracket and faces a detecting area by the front surface 112.

Figure 3:
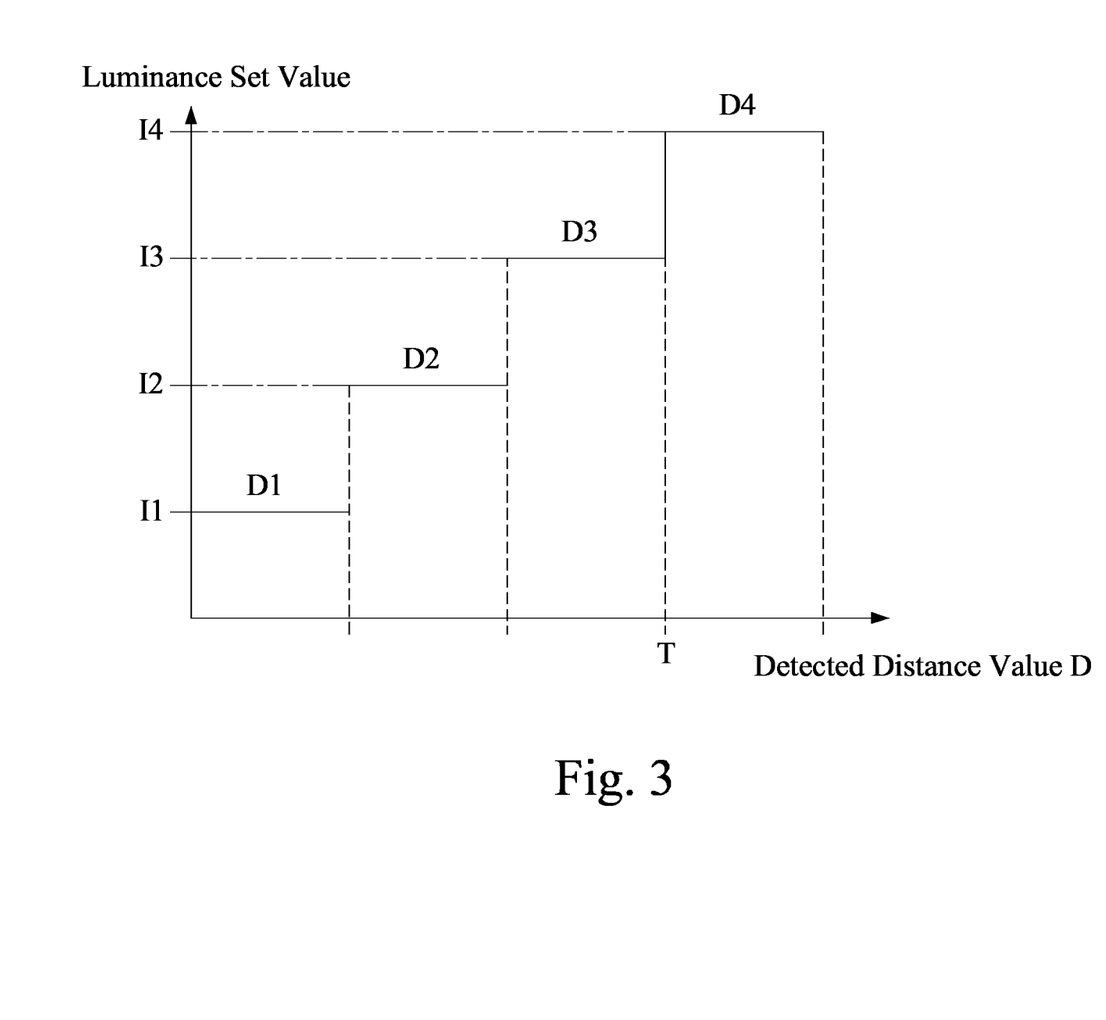
FIG. 3 is a corresponding relation diagram of a detected distance value and a luminance in the first embodiment of this disclosure.

As shown in FIG. 2 and FIG. 3, the data processing circuit 130 is disposed in the internal space of the casing 110. The distance detector 120 is electrically connected to the data processing circuit 130 and transmits the detected distance value D to the data processing circuit 130. The data processing circuit 130 determines a distance threshold T and determines whether the detected distance value D is smaller than the distance threshold T. When no object approaches in the detecting area, for example, when no human body or face enters the detecting area, the detected distance value D is fixed value set to be larger than the distance threshold T. For example, since a distance of a background object capable of being detected by the distance detector 120, or a distance of the background object exceeds the maximum detection range of the distance detector 120, an effective detected distance value D cannot be obtained.

As shown in FIG. 1, FIG. 2 and FIG. 3, the infrared light transmitters 140 are disposed on the front surface 112 and electrically connected to the data processing circuit 130. The infrared light transmitters 140 are configured to emit an infrared light in front of the front surface 112. When the detected distance value D is smaller than the distance threshold T, the data processing circuit 130 determines a luminance corresponding to the detected distance value D and drives the infrared light transmitters 140 to emit the infrared light according to the corresponding luminance. In one specific embodiment, the luminance may be light emission power (watt) of the infrared light transmitters 140; for example, the infrared light transmitters 140 emit the infrared light at a specified power; or the luminance may be a magnitude of driving voltage for driving the infrared light transmitters 140. The data processing circuit 130 may determine driving voltage values corresponding to different detected distance values D within a driving voltage range of the infrared light transmitters 140. In one specific embodiment, the infrared light transmitters 140 are driven by a pulse current. The luminance may be a width of the pulse current or a duty cycle length of the pulse current. The data processing circuit 130 may determine the width or a duty cycle of the pulse current corresponding to different detected distance values D within a working frequency range of the infrared light transmitters 140. The larger the detected distance value D is, the larger the corresponding luminance is. Otherwise, the smaller the detected distance value D is, the smaller the corresponding luminance is.

As shown in FIG. 3, in one specific embodiment, the data processing circuit 130 further divides a range of the distance threshold T into two or more distance intervals D1, D2, D3, and determines the luminance to have a plurality of set values I1, I2, I3. The data processing circuit 130 determines the corresponding one of the set values I1, I2, I3 for each of the distance intervals D1, D2, D3, so as to drive the infrared light transmitters 140 to emit the infrared light. Above the distance threshold T, the distance detector 120 is still capable of obtaining a detected distance value D in a distance interval D4 not larger than the maximum detection distance, and the data processing circuit 130 is also capable of determining a corresponding set value I4 for the distance interval D4. The set value I4 may be the maximum luminance within a capability of the infrared light transmitters 140.

Thus, in the above specific embodiment, the larger average distances of the distance intervals D1, D2, D3 are, the larger the corresponding set values I1, I2, I3 are. Otherwise, the smaller the average distances of the distance intervals D1, D2, D3 are, the smaller the corresponding set values I1, I2, I3 are. Thus, when the detected distance value D falls in one of the plurality of distance intervals D1, D2, D3, the data processing circuit 130 drives the infrared light transmitters 140 to emit the infrared light at the corresponding one of the set values I1, I2, I3. According to corresponding switching of the set values I1, I2, I3 and the distance intervals D1, D2, D3, an infrared light irradiance (W/m2) of a surface of an object can be maintained within an appropriate numerical value range when the object is in the distance intervals D1, D2, D3.

As shown in FIG. 1 and FIG. 2, the infrared light camera 150 is disposed on the front surface 112 and electrically connected to the data processing circuit 130. The infrared light camera 150 is configured to capture an infrared light image Pir in front of the front surface 112 of the casing 110 and transmit the infrared light image Pir to the data processing circuit 130. The infrared light image Pir is mainly formed after the infrared light emitted by the infrared light transmitters 140 is reflected by the object.

The data processing circuit 130 continuously determines whether the detected distance value D is smaller than the distance threshold T. When the detected distance value D is smaller than the distance threshold T, the data processing circuit 130 determines the luminance corresponding to the detected distance value D and drives the infrared light transmitters 140 to emit the infrared light according to the luminance. The data processing circuit 130 starts the infrared light camera 150 at the same time to capture the infrared light image Pir. The data processing circuit 130 performs face identification according to the infrared light image Pir. The data processing circuit 130 analyzes whether there is a face in the infrared light image Pir, corrects an image of the face and then captures a face eigenvector combination of the face. The face eigenvector combination is generated by respectively taking out eigenvectors by utilizing facial feature points (such as eyebrow, eyes, nose and lips) of the face as anchor points. After capturing the face eigenvector combination, the data processing circuit 130 compares whether the face eigenvector combination matches one of a plurality of preset eigenvector combinations in an eigenface database. When the face eigenvector combination matches one of the plurality of preset eigenvector combinations, the face identification is successful, and the data processing circuit 130 performs a corresponding event.

As shown in FIG. 1 and FIG. 2, the visible light camera 160 and the display panel 170 are electrically connected to the data processing circuit 130. The visible light camera 160 and the display panel 170 are disposed on the front surface 112 of the casing 110.

The visible light camera 160 is configured to capture a visible light image Pv in front of the front surface 112 of the casing 110 and transmit the visible light image Pv to the data processing circuit 130, so that the data processing circuit 130 drives the display panel 170 to display the visible light image Pv. Therefore, a user can confirm and regulate a self-position through display of the display panel 170 so as to guarantee that the self-position and a posture can make the infrared light camera 150 be capable of capturing his/her face.

The foregoing corresponding event may be, but is not limited to, door lock opening, attendance recording, access control recording, book borrowing recording, etc. For example, a gate is arranged in a workplace and controlled by the data processing circuit 130. When the face identification is successful, the data processing circuit 130 may record office hours of the user, opening the gate, etc. as the corresponding event. The foregoing corresponding event performed by the data processing circuit 130 may further include the work that the data processing circuit 130 drives the display panel 170 to display a successful identification prompt. The successful identification prompt may include displaying a user identity data.

Figure 4:
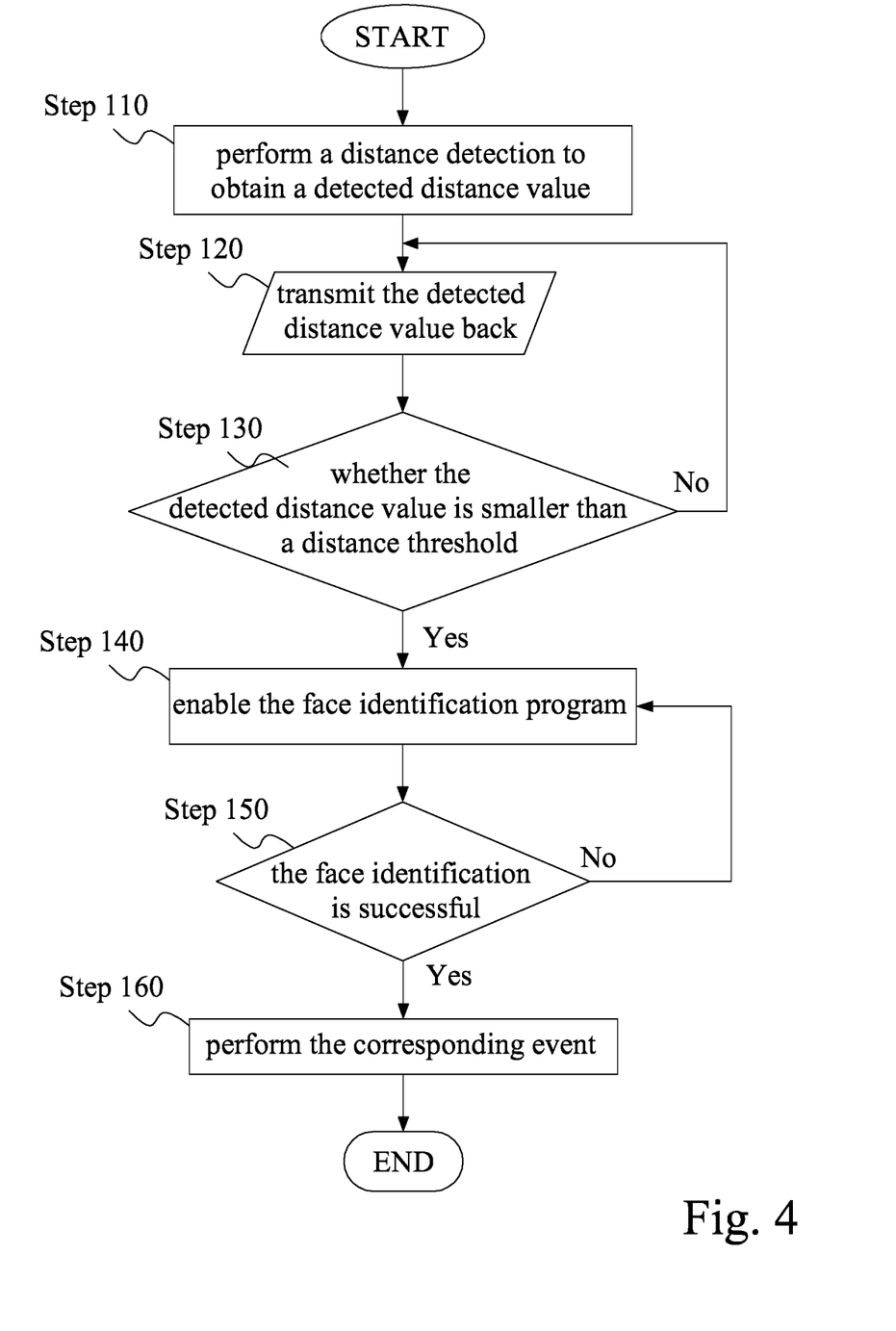
FIG. 4 is a flow chart of a method of the first embodiment of this disclosure.

As shown in FIG. 4, based on the above face identification apparatus 100, this disclosure further discloses a face identification method.

As shown in FIG. 4, after the face identification apparatus 100 is started, the data processing circuit 130 enables the distance detector 120 to perform a distance detection so as to obtain the detected distance value D, as shown in Step 110. The data processing circuit 130 loads a face identification program but switches the face identification program to be in an idle state. That is, the face identification program is not enabled and is only in a state of being able to be started at any time. The face identification apparatus 100 at the moment will not perform the face identification so as to avoid computing resource consumption caused by the data processing circuit 130 continuously performing a high-load computing.

As shown in FIG. 4, the distance detector 120 continuously performs the distance detection, and continuously transmits the detected distance value D back to the data processing circuit 130, as shown in Step 120. The data processing circuit 130 determines a distance threshold T, and the data processing circuit 130 determines whether the detected distance value D is smaller than the distance threshold T, as shown in Step 130. When the detected distance value D is larger than the distance threshold T, Step 120 is repeated, and the data processing circuit 130 receives new detected distance value D transmitted back.

When the user appears in front of the front surface 112 and enters the detecting area, the distance detector 120 detects the user, so that the corresponding detected distance value D is obtained according to a distance between the user and the distance detector 120. When the detected distance value D is smaller than the distance threshold T, the data processing circuit 130 enables the face identification program, as shown in Step 140.

Figure 5:
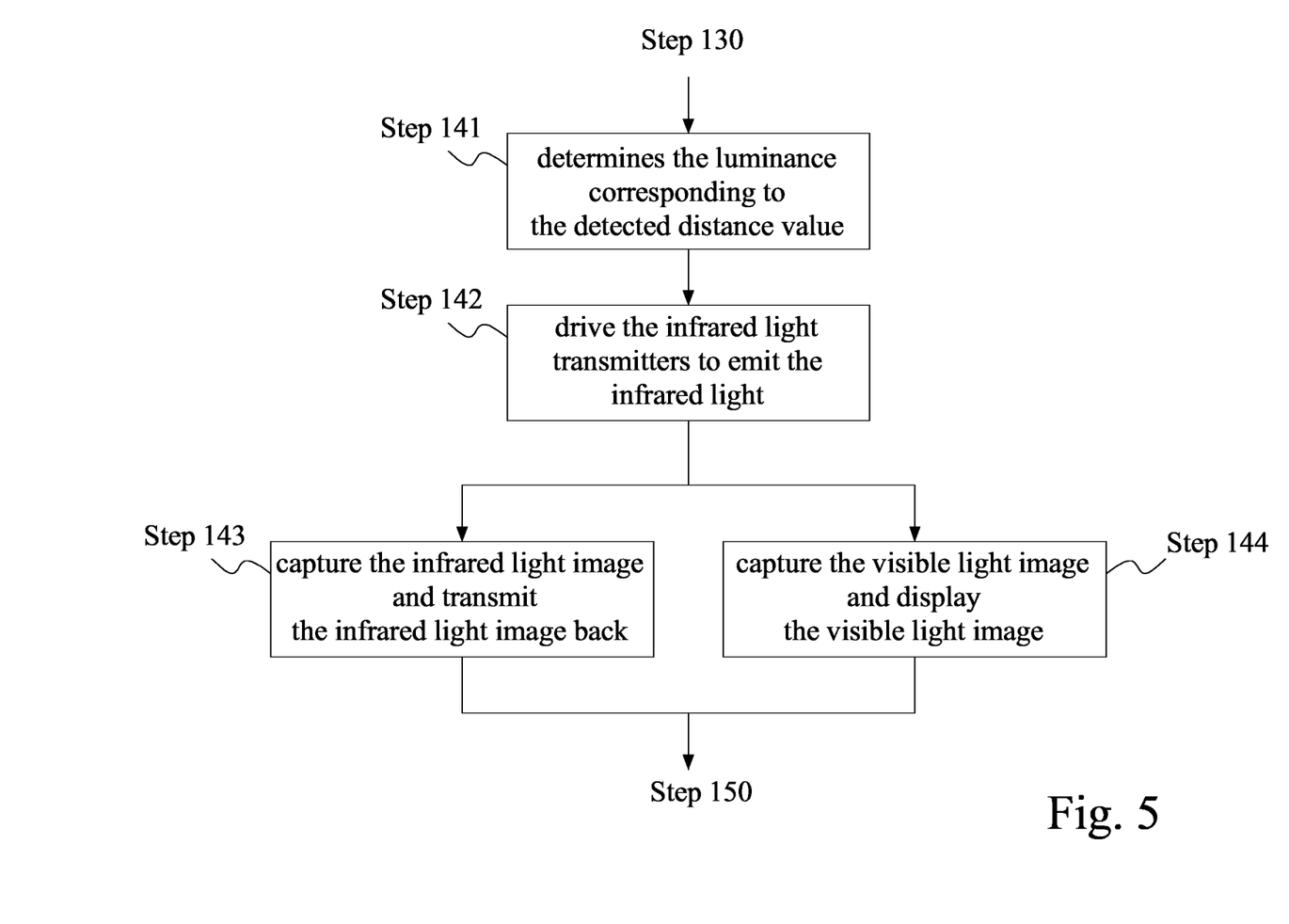
FIG. 5 is another flow chart of the method of the first embodiment of this disclosure.

As shown in FIG. 5, enabling the face identification program includes that the data processing circuit 130 determines the luminance corresponding to the detected distance value D and drives the infrared light transmitters 140 to emit the infrared light according to the corresponding luminance, as shown in Step 141 and Step 142. Then, the data processing circuit 130 starts the infrared light camera 150 to start to capture the infrared light image Pir and transmit the infrared light image back, as shown in Step 143.

According to different detected distance values D, the corresponding luminance is determined to emit the infrared light so as to guarantee that the infrared light image Pir can have good image exposure and a clear image capturing effect. The specific implementation is shown in FIG. 3, the range of the distance threshold T is divided into the two or more distance intervals D1, D2, D3, the luminance has the plurality of set values I1, I2, I3, and each of the plurality of distance intervals D1, D2, D3 corresponds to one of the plurality of set values I1, I2, I3.

When the detected distance value D is larger than the distance threshold T but still in the distance interval D4 where the infrared light transmitters 140 are capable of obtaining the detected distance value D, the data processing circuit 130 does not perform the face identification but is still capable of driving the infrared light transmitters 140 to emit the infrared light at the set value I4, so that the infrared light transmitters 140 maintain the set value I4 of the maximum luminance within the capability of the luminance to emit the infrared light, and surroundings are illuminated by the infrared light.

Figure 6:
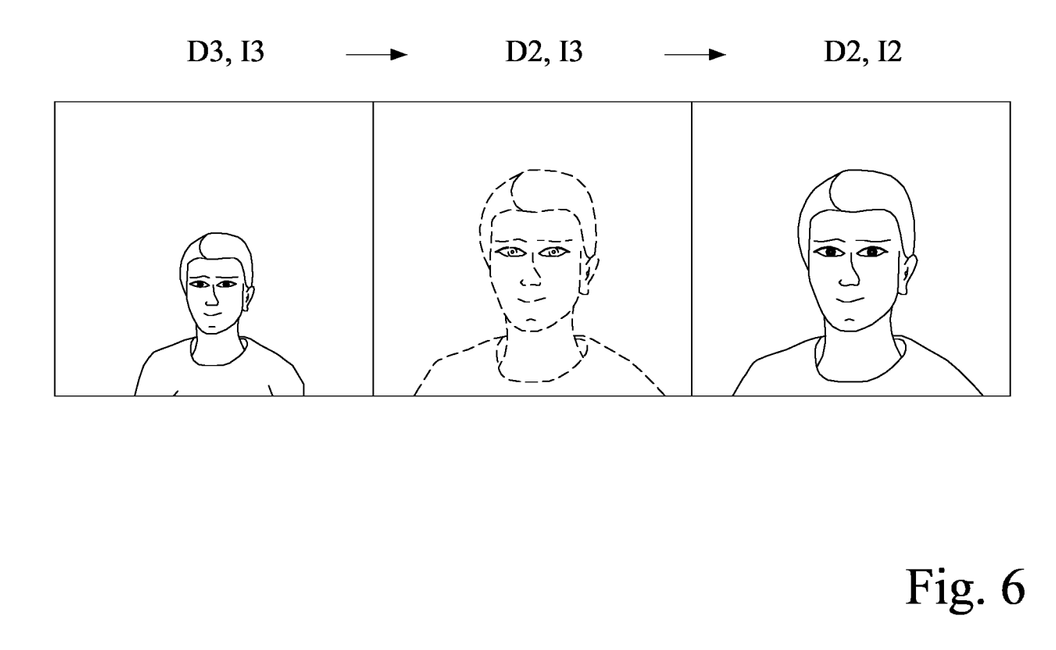
FIG. 6 and FIG. 7 are schematic diagrams of switching of the detected distance value and the luminance.

As shown in FIG. 6, when the face enters into an image capturing range of the infrared light camera 150, and the detected distance value D is smaller than the distance threshold T and falls in a range of the distance interval D3, the infrared light transmitters 140 take the maximum set value I3 as the luminance firstly to emit the infrared light, so that the face can still be fully illuminated at a long distance, and it is guaranteed that the infrared light image Pir is sufficiently exposed and is clear enough. At the moment, if the user continuously approaches the face identification apparatus 100 to have the detected distance value D to fall in the distance interval D2 or the distance interval D1, the luminance of the set value I3 is too high, which results in that the infrared light image Pir is too bright, and consequently, features of the face become unclear. At the moment, the data processing circuit 130 determines the corresponding luminance as the set value I2 according to the distance interval D2, so that the infrared light image Pir can be moderately exposed and the face is clearly presented in the infrared light image Pir.

Figure 7:
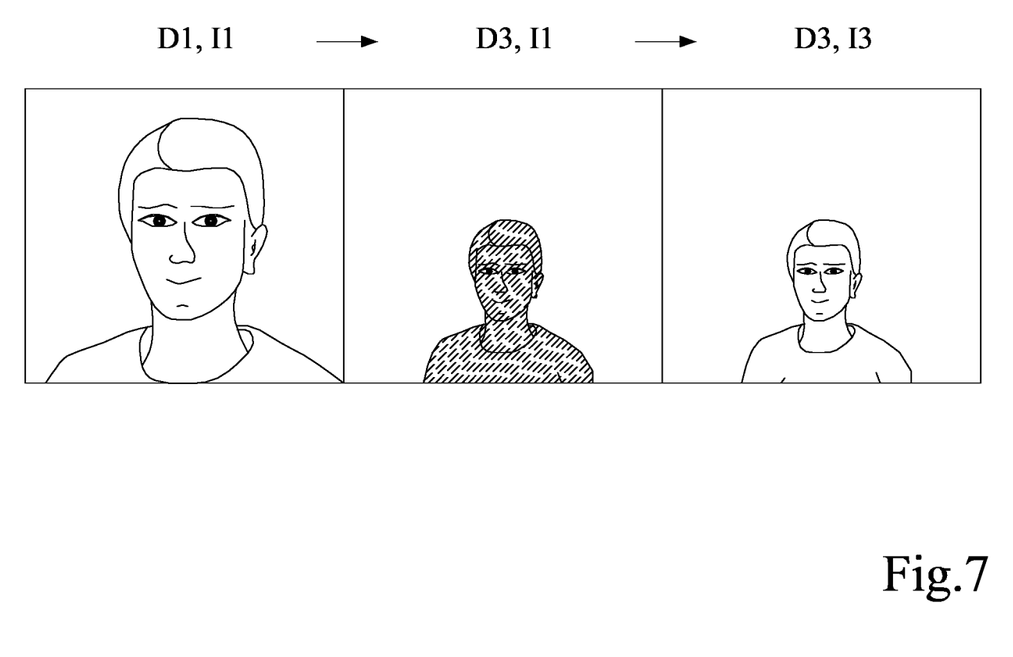

As shown in FIG. 7, if the face enters a smaller distance interval such as the distance interval D1 at the beginning, the infrared light transmitters 140 will take the smaller set value I1 as the luminance to emit the infrared light, so that the infrared light image Pir is moderately exposed and the face is clear enough. But if the user moves to change the distance to increase the detected distance value D to be in the distance interval D3 or the distance interval D2, the luminance of the set value I1 will be insufficient, which results in that the infrared light image Pir is underexposed and is too dark, and consequently, the features of the cannot be clearly presented infrared light image Pir. At the moment, the data processing circuit 130 determines the corresponding luminance to be increased as the set value I3 according to the distance interval D3, so that the face in the infrared light image Pir can be presented clearly.

As shown in FIG. 5, at the same time, the data processing circuit 130 starts the visible light camera 160 to capture the visible light image Pv and drives the display panel 170 to display the visible light image Pv, as shown in Step 144. At the moment, the user can regulate the self-position and the posture according to display of the display panel 170 so as to guarantee that the face of the user can be captured by the infrared light camera 150.

The foregoing infrared light transmitters 140 may normally emit the infrared light at the maximum luminance such as the set value I4 within the capability to perform infrared light illumination around. The infrared light camera 150 continuously captures an infrared light image Pir stream and stores the stream to the data processing circuit 130. But the data processing circuit 130 at the moment does not perform the face identification and only records a video. As well, the visible light camera 160 may also normally capture a visible light image Pv stream. The data processing circuit 130 records the video, but does not drive the display panel 170 to display the video.

Then, the data processing circuit 130 performs the face identification according to the infrared light image Pir and compare whether the face eigenvector combination of the face of the infrared light image Pir matches one of the plurality of preset eigenvector combinations in the eigenface database, as shown in Step 150. The above-mentioned plurality means including two or more.

When the face eigenvector combination matches one of the plurality of preset eigenvector combinations, the face identification is successful, and the data processing circuit 130 performs the corresponding event, as shown in Step 160. The foregoing corresponding event may be, but is not limited to, door lock opening, attendance recording, access control recording, book borrowing recording, etc.

Thus, by means of the above face identification apparatus 100 and the face identification method, the face identification program is normally in the idle state, so that hardware of the face identification apparatus 100 does not continuously maintain a high computing load due to continuously performing the face identification program. Thus, a usual load of the face identification apparatus 100 can be reduced, and power consumption is reduced.

In this disclosure, the data processing circuit 130 may be implemented by hardware or a combination of the hardware and software. For example, the data processing circuit 130 may further include a system logic chipset, a central processing unit, a non-volatile memory module, a volatile memory module and a graphic processing unit. The non-volatile memory module is configured to store program instructions. The central processing unit may load the instructions from a non-volatile memory to a volatile memory module to be performed so as to start the face identification program and switch the face identification program to be in the idle state.

Foregoing descriptions are only one example of the data processing circuit 130, not excluding integration of part or all of components into a single integrated circuit component. It is also not excluded that other circuit design is adopted to replace the foregoing components as the data processing circuit 130.

Figure 8:
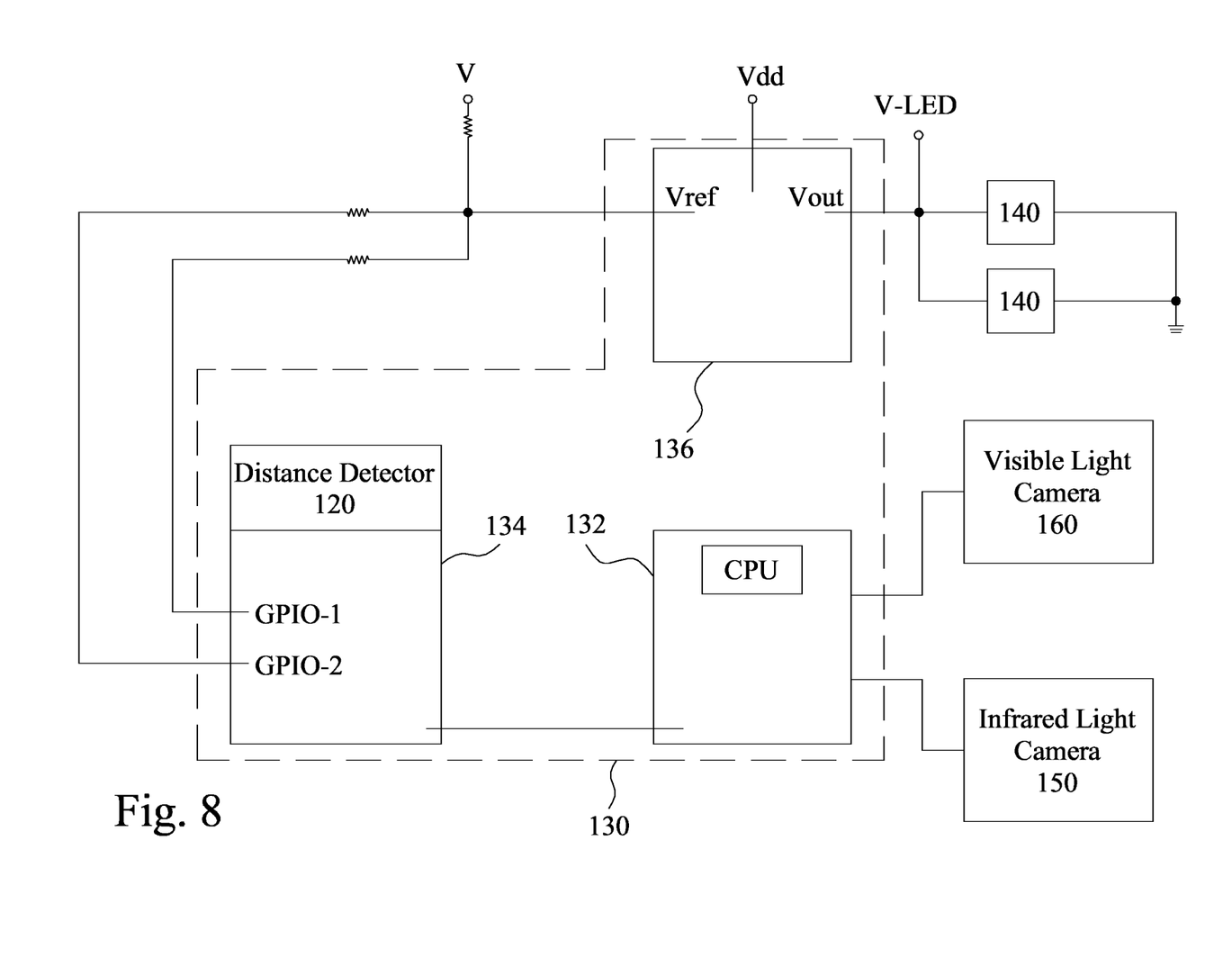
FIG. 8 is a circuit block diagram according to a second embodiment of this disclosure.

Referring to FIG. 8, a face identification apparatus 100 disclosed by a second embodiment of this disclosure is shown, and is configured to provide an example of another data processing circuit 130. The data processing circuit 130 may be divided into three parts including a computing unit 132, a driving circuit 134 of a distance detector 120 and a voltage regulator 136.

The computing unit 132 includes components such as a central processing unit (CPU) and a system logic chipset and is configured to perform face identification. The computing unit 132 may be connected to an infrared light camera 150 and a visible light camera 160 through a USB bus (or other interfaces such as an MIPI-CSI). The computing unit 132 is connected to the driving circuit 134 of the distance detector 120 through an I2C interface (or other interfaces such as an SMBus and a USB). Meanwhile, the driving circuit 134 may be connected to the voltage regulator 136 through two output pins such as general input and output pins GPIO-1 and GPIO-2. The general input and output pins GPIO-1 and GPIO-2 and a base voltage V are in parallel connection with the voltage regulator 136 respectively through resistors, so that a reference voltage Vref is regulated and output to the voltage regulator 136 through the general input and output pins GPIO-1 and GPIO-2. The voltage regulator 136 is connected to a power source Vdd, such as a power source with +5V voltage, and outputs an output voltage Vout according to the reference voltage Vref to regulate a magnitude of a driving voltage V-LED of infrared light transmitters 140, so that one of set values I1, I2, I3 and I4 is selected to change a luminance.

The distance detector 120 may be an IR distance detector, a distance detector and a time of flight (TOF) detector. A detected distance value D detected by the distance detector 120 is coded by the driving circuit 134 and then continuously transmitted back to the CPU of the computing unit 132.

When the detected distance value D is larger than a distance threshold T and the detected distance value D is relatively maximum, for example, falling in a distance interval D4 of distance intervals D1, D2, D3 and D4, the data processing circuit 130 does not perform face identification and does not switch the set values I1, I2, I3 and I4 of the luminance of the infrared light transmitters 140 either. At the moment, the computing unit 132 controls the driving circuit 134 of the distance detector 120 to make the two general input and output pins GPIO-1 and GPIO-2 be both maintained in an open drain state. At the moment, the reference voltage Vref is maintained at the maximum voltage (such as Vref=2.5 V), so that the driving voltage V-LED is output at the maximum voltage preset value (such as 2.5 V). The infrared light transmitters 140 maintain the set value I4 of the maximum luminance within a capability as the luminance to emit an infrared light, and surroundings are illuminated by the infrared light.

When the detected distance value D is smaller than the distance threshold T and the detected distance value D is relatively small, for example, falling in the distance interval D1 of the distance intervals D1, D2, D3, the computing unit 132 controls the driving circuit 134 of the distance detector 120 to make the two general input and output pins GPIO-1 and GPIO-2 be both maintained in a low level state. At the moment, the reference voltage Vref is reduced to the minimum value (such as Vref=1.5 V) to make the driving voltage V-LED be reduced to the minimum voltage preset value (such as 1.5 V), so that the infrared light transmitters 140 maintain the minimum set value I1 as the luminance to emit the infrared light, and an excessively-bright infrared light image Pir is avoided.

When the detected distance value D is smaller than the distance threshold T and the detected distance value D is at an intermediate value, for example, falling in the distance interval D2, the computing unit 132 controls the driving circuit 134 of the distance detector 120 through I2C, so that the general input and output pin GPIO-1 is switched to be at a low level, and the general input and output pin GPIO-2 is switched to be in an open drain state. At the moment, the reference voltage Vref also falls in an intermediate value (such as Vref=1.833 V) between the maximum value and the minimum value to make the driving voltage V-LED be regulated to an intermediate voltage preset value 1.833 V, so that the infrared light transmitters 140 maintain the intermediate set value I2 as the luminance to emit the infrared light, and brightness of the infrared light image Pir is moderate and enough to allow the computing unit 132 to perform the face identification.

When the detected distance value D is smaller than the distance threshold T and the detected distance value D is relatively large, for example, falling in the distance interval D3, the computing unit 132 controls the driving circuit 134 of the distance detector 120 through the I2C, so that the general input and output pin GPIO-1 is switched to be in an open drain state, and the general input and output pin GPIO-2 is switched to be at a low level. At the moment, the reference voltage Vref rises to be higher than the intermediate value (such as Vref=2.167 V) to make the driving voltage V-LED rise (for example, rising to 2.167 V), so that the infrared light transmitters 140 maintain the maximum set value I3 as the luminance to emit the infrared light, the infrared light image Pir with enough brightness of a face at a long distance can also be captured, and the brightness of the infrared light image Pir is enough to allow the computing unit 132 to perform the face identification.

In the foregoing one or more embodiments, the three distance intervals D1, D2, D3 corresponding to the three set values I1, I2, I3 of the luminance are only examples, and the corresponding number thereof is not limited to three and may be two or four or more. Meanwhile, at least one distance interval (such as the distance interval D4) can still be set above the distance threshold T, and the distance interval D4 also corresponds to one set value I4.

In one or more embodiments of this disclosure, the face identification apparatus 100 switches the face identification program to be in the state of being idle and being awakened and started at any time. The face identification apparatus 100 determines whether the face identification program is awakened and started according to the detected distance value D. Therefore, the face identification apparatus 100 does not continuously perform the face identification program, so that continuous consumption of hardware computing resources into the face identification program is avoided. Therefore, this disclosure can effectively reduce an average computing load of the face identification apparatus 100 and avoids unnecessary power consumption. Meanwhile, reducing the load of the system can avoid an over-temperature condition of the system to avoid the system entering into a low clock rate operation, so that the face identification program can be quickly completed.

In addition, in at least one embodiment, this disclosure utilizes the detected distance value D to determine the set values I1, I2, I3 of the luminance configured to illuminate, so as to guarantee that the optimal image exposure and image capturing effects of the face can be obtained from far to near, which facilitates performing of the face identification.

What is claimed is:

1. A face identification method, comprising:
performing a distance detection to obtain a detected distance value;
determining whether the detected distance value is smaller than a distance threshold;
when the detected distance value is smaller than the distance threshold, determining a luminance corresponding to the detected distance value and emitting an infrared light according to the luminance;
capturing an infrared light image and performing face identification to the infrared light image; and
when the face identification is successful, performing a corresponding event;
wherein emitting the infrared light according to the luminance comprising:
controlling a driving circuit to switch a reference voltage according to the detected distance value, so as to regulate a magnitude of a driving voltage output to an infrared light transmitter by a voltage regulator, so that the luminance of the infrared light transmitter corresponds to the detected distance value;
wherein the driving circuit comprises two GPIO pins respectively connecting to a base voltage in parallel through resistors, so that the reference voltage is regulated according to a level state of the GPIO pins and output to the voltage regulator through the GPIO pins.

2. The face identification method according to claim 1, wherein a range of the distance threshold is divided into a plurality of distance intervals, the luminance has a plurality of set values, and each of the plurality of distance intervals corresponds to one of the plurality of set values.

3. The face identification method according to claim 1, wherein the face identification comprises:
analyzing whether there is a face in the infrared light image, and correcting an image of the face;
capturing a face eigenvector combination of the face; and
comparing whether the face eigenvector combination matches one of a plurality of preset eigenvector combinations in an eigenface database.

4. The face identification method according to claim 1, further comprising: when the detected distance value is smaller than the distance threshold, capturing a visible light image, and displaying the visible light image.

5. The face identification method according to claim 1, further comprising: when the face identification is successful, displaying a successful identification prompt, wherein the successful identification prompt comprises a user identity data.

6. A face identification apparatus, comprising:
a distance detector, configured to obtain a detected distance value;
an infrared light transmitter, configured to emit an infrared light;
an infrared light image capturing camera, configured to capture an infrared light image; and
a data processing circuit, configured to determine whether the detected distance value is smaller than a distance threshold;
wherein when the detected distance value is smaller than the distance threshold, the data processing circuit determines a luminance corresponding to the detected distance value, and drives the infrared light transmitter to emit the infrared light according to the luminance; and the data processing circuit performs face identification to the infrared light image, and when the face identification is successful, the data processing circuit performs a corresponding event;
wherein the data processing circuit comprises:
a computing unit electrically connected to the infrared light camera;
a driving circuit, electrically connected to the computing unit and the distance detector, wherein the detected distance value is coded by the driving circuit and transmitted to the computing unit; and
a voltage regulator, connected to the driving circuit and the infrared light transmitter, and receiving a reference voltage from the driving circuit;
wherein the computing unit controls the driving circuit to switch the reference voltage according to the detected distance value, so as to regulate a magnitude of a driving voltage output to the infrared light transmitter by the voltage regulator, so that the luminance of the infrared light transmitter corresponds to the detected distance value;
wherein the driving circuit comprises two GPIO pins respectively connecting to a base voltage in parallel through resistors, so that the reference voltage is regulated according to a level state of the GPIO pins and output to the voltage regulator through the GPIO pins.

7. The face identification apparatus according to claim 6, further comprising:
a visible light camera, configured to capture a visible light image and transmit the visible light image to the data processing circuit; and
a display panel, configured to be driven by the data processing circuit to display the visible light image.

8. The face identification apparatus according to claim 6, wherein a range of the distance threshold is divided into a plurality of distance intervals, the luminance has a plurality of set values, and each of the plurality of distance intervals corresponds to one of the plurality of set values.

9. The face identification apparatus according to claim 7, further comprising: a casing comprising an internal space and a front surface; the distance detector is disposed on the front surface and configured to obtain the detected distance value in front of the front surface; the data processing circuit is disposed in the internal space; and the infrared light transmitter, the infrared light camera, the visible light camera and the display panel are disposed on the front surface.

10. The face identification apparatus according to claim 7, wherein when the face identification is successful, the data processing circuit drives the display panel to display a successful identification prompt, wherein the successful identification prompt comprises a user identity data.

* * * * *